(12) United States Patent
Steijnen et al.

(10) Patent No.: US 12,427,466 B2
(45) Date of Patent: Sep. 30, 2025

(54) FILTER DEVICE AND METHOD FOR MOUNTING SUCH A FILTER DEVICE

(71) Applicant: ATLAS COPCO AIRPOWER N.V., Wilrijk (BE)

(72) Inventors: Marc Steijnen, Wilrijk (BE); Sylwester Manski, Wilrijk (BE); Peter Waeterschoot, Kruibeke (BE)

(73) Assignee: ATLAS COPCO AIRPOWER N.V., Wilrijk (BE)

( * ) Notice: Subject to any disclaimer, the term of this patent is extended or adjusted under 35 U.S.C. 154(b) by 1018 days.

(21) Appl. No.: 15/733,963

(22) PCT Filed: Jun. 19, 2019

(86) PCT No.: PCT/IB2019/055137
§ 371 (c)(1),
(2) Date: Dec. 1, 2020

(87) PCT Pub. No.: WO2020/003058
PCT Pub. Date: Jan. 2, 2020

(65) Prior Publication Data
US 2021/0229016 A1    Jul. 29, 2021

(30) Foreign Application Priority Data
Jun. 26, 2018   (BE) .................................. 2018/5445

(51) Int. Cl.
*B01D 46/00* (2022.01)
*B01D 46/24* (2006.01)
*B01D 46/42* (2006.01)

(52) U.S. Cl.
CPC ..... *B01D 46/2414* (2013.01); *B01D 46/0004* (2013.01); *B01D 46/0005* (2013.01);
(Continued)

(58) Field of Classification Search
CPC ............ B01D 46/2414; B01D 46/0004; B01D 46/0005; B01D 46/0043; B01D 46/4227;
(Continued)

(56) References Cited

U.S. PATENT DOCUMENTS 4,806,240 A    2/1989  Giordano et al.
4,915,831 A *  4/1990  Taylor .................... B01D 35/30
                                                          55/504
(Continued)

FOREIGN PATENT DOCUMENTS

DE    40 21 790 A1    1/1992
EP    0 231 862 A2    8/1987
(Continued)

OTHER PUBLICATIONS

International Search Report dated Aug. 20, 2019 in International Application No. PCT/IB2019/055137.
(Continued)

*Primary Examiner* — T. Bennett McKenzie
(74) *Attorney, Agent, or Firm* — Sughrue Mion, PLLC

(57) ABSTRACT

A filter device for the separation of impurities from a gas, including a filter housing having a lid and a pot; a filter element installed in the pot; a top cap has an inlet duct for receiving gas to be purified, the inlet duct connects to the inlet of the lid; a positioning device configured to position the top cap in relation to the lid when mounting the pot on the lid, and on the other hand with pressure device configured to press the entrance of the inlet duct against the inlet of the lid after mounting the pot on the lid, whereby the positioning device and the pressure device are designed in such a way that the positioning device come into action earlier than the pressure device during the mounting of the pot on the lid.

14 Claims, 3 Drawing Sheets

(52) U.S. Cl.
CPC ..... *B01D 46/0043* (2013.01); *B01D 46/4227* (2013.01); *B01D 2265/022* (2013.01); *B01D 2265/026* (2013.01); *B01D 2265/029* (2013.01); *B01D 2271/022* (2013.01)

(58) Field of Classification Search
CPC ........ B01D 2271/022; B01D 2265/022; B01D 2265/026; B01D 2265/029; B01D 46/88; B01D 2265/021; B01D 46/2411; B01D 46/42; B01D 46/0002; B01D 46/001; B01D 46/24
USPC .......................................................... 55/357
See application file for complete search history.

(56) References Cited

U.S. PATENT DOCUMENTS

| | | | |
|---|---|---|---|
| 5,128,034 A * | 7/1992 | Kool | ............... C02F 1/003 210/441 |
| 5,826,854 A | 10/1998 | Janvrin et al. | |
| 5,914,037 A | 6/1999 | Yen | |
| 6,391,197 B1 | 5/2002 | Billiet | |
| 6,409,786 B1 | 6/2002 | Wright et al. | |
| 6,663,685 B2 | 12/2003 | Wright et al. | |
| 7,344,582 B2 | 3/2008 | Pearson et al. | |
| 7,442,220 B2 | 10/2008 | Pearson et al. | |
| 7,503,952 B2 | 3/2009 | Lane et al. | |
| 7,833,304 B2 | 11/2010 | Pearson et al. | |
| 2006/0125187 A1 * | 6/2006 | Bartlett | ............ B01D 63/081 277/315 |
| 2006/0143853 A1 | 7/2006 | Agerlid et al. | |
| 2010/0139585 A1 | 6/2010 | Frazier, Jr. | |
| 2015/0013293 A1 * | 1/2015 | Wagner | ............ B01D 46/521 55/502 |
| 2015/0128546 A1 * | 5/2015 | Walker | ............ B01D 46/0004 55/502 |

FOREIGN PATENT DOCUMENTS

| | | |
|---|---|---|
| EP | 1 042 045 B1 | 5/2004 |
| EP | 1 042 046 B1 | 6/2004 |
| EP | 1 042 047 B1 | 2/2005 |
| EP | 1 970 113 A1 | 9/2008 |
| EP | 2 151 267 A1 | 2/2010 |
| EP | 1 799 324 B1 | 5/2010 |
| EP | 1 804 954 B1 | 6/2010 |
| EP | 1 784 246 B1 | 6/2011 |
| EP | 1 799 323 B1 | 1/2012 |
| GB | 2 408 223 A | 5/2005 |
| WO | WO-9930803 A1 * | 6/1999 ......... B01D 46/0004 |

OTHER PUBLICATIONS

Written Opinion of the International Searching Authority dated Aug. 20, 2019 in International Application No. PCT/IB2019/055137.
International Preliminary Report on Patentability dated Jun. 4, 2020 in International Application No. PCT/IB2019/055137.

* cited by examiner

FILTER DEVICE AND METHOD FOR MOUNTING SUCH A FILTER DEVICE

CROSS REFERENCE TO RELATED APPLICATIONS

This application is a National Stage of International Application No. PCT/IB2019/055137 filed Jun. 19, 2019, claiming priority based on Belgian Patent Application No. 2018/5445 filed Jun. 26, 2018.

BACKGROUND OF THE INVENTION

Field of the Invention

The current invention relates to a filter device and method for mounting such a filter device.

More specifically, the invention is intended to filter out impurities such as oil and dust from a gas such as compressed air.

Background

There are already such filter devices known, which consist of a filter housing in which a filter element can be placed. The filter housing consists of a lid and a pot containing the filter element, whereby the lid is typically screwed onto the pot or connected to the pot via a bayonet fitting.

The lid is provided with an inlet for gas to be purified and an outlet for purified gas.

The filter element itself consists of a top cap and a bottom cap with in between them a filter cartridge consisting of filter material.

The top cap is provided with an inlet duct that will lead gas to be purified to the inside of the filter cartridge. When the filter element is installed, the entrance of the inlet duct is connected to the inlet of the lid, so that the gas to be purified that flows through the inlet of the lid into the filter device is directed to the filter cartridge.

There is a space between the lid and the top cap which is connected to the outlet of the lid, whereby the gas passed through the filter cartridge can leave the filter device via the aforementioned space and the outlet.

It is known that the design of the inlet duct in the top cap will play an important role related to the pressure drop in the filter device.

It is also known that the seal between the inlet of the lid and the entrance of the inlet duct is very important to prevent leaks from the inlet of the lid and the entrance of the inlet duct to the aforementioned space which is connected to the outlet of the lid.

In the known filter devices, this seal is often not 100%, causing leaks and enabling unpurified gas to pass through the filter device.

Traditionally, the lid of the filter device has been built into a pipe, for example, the discharge pipe of a compressor.

When the filter element needs to be replaced, the pot is detached from the lid.

The filter element can then be removed from the lid or from the pot and be replaced.

Then the pot with the filter element is fixed back onto the lid. Hereby, it is very important that the top cap, with the inlet duct, is positioned correctly in relation to the lid, so that the inlet duct is connected to the inlet of the lid.

A disadvantage is that the reinstallation of the pot with the filter cartridge has to be done very accurately, so that this action will take extra time.

An additional disadvantage is that when mistakes are made in this action, for example because the necessary accuracy is not displayed, leaks can occur causing unpurified gas to flow to the outlet of the lid without first passing through the filter cartridge.

The design of the top cap and the lid of the filter device in such a way that the top cap already fits tightly in the lid during mounting in order to ensure a correctly sealed connection of the inlet duct of the top cap to the inlet of the lid after mounting and thus to avoid the aforementioned leaks, causes undesired friction between the top cap and the lid and thus complicates the mounting of the pot on the lid.

This invention aims at solving at least one of the aforementioned and other disadvantages.

SUMMARY OF THE INVENTION

This invention has a filter device for separating impurities from a gas, whereby the filter device comprises a filter housing consisting of a lid and a pot, whereby a filter element is installed in the pot, which filter element consists of a top cap and a bottom cap with a filter cartridge in between, whereby the lid is provided with an inlet for gas to be purified and an outlet for purified gas, whereby the top cap is provided with an inlet duct that will lead gas to be purified to the filter cartridge, whereby when the pot is mounted on the lid, an entrance of the inlet duct connects to the inlet of the lid and between the lid and the top cap is a space that is connected to the lid outlet, with the characteristic that the filter device is provided on the one hand with positioning means configured to position the top cap in relation to the lid when mounting the pot on the lid, and, on the other hand, with pressure means configured to press the entrance of the inlet duct against the inlet of the lid after mounting the pot on the lid, whereby the positioning means and pressure means are designed in such a way that the positioning means, during mounting of the pot on the lid, take effect earlier than the pressure means.

An advantage is that the positioning means will ensure that the top cap is correctly positioned in relation to the lid, so that the inlet of the lid is aligned with the inlet duct.

This will ensure that the gas to be purified is correctly guided into the filter element.

Another advantage is that leaks can be avoided by pressing the seal between the entrance of the inlet duct and the inlet of the lid.

As the pressure means during the mounting of the pot on the lid only take effect later than the positioning means, friction between the top cap and the lid, which occurs during mounting when connecting the top cap and the lid, is reduced or avoided. Only after the correct alignment of the entrance of the inlet duct with the inlet of the lid has been almost or fully achieved, the entrance will be pressed towards the inlet, which will allow a good and easy mounting of the pot on the lid.

Preferably, the entrance of the inlet duct or the inlet of the lid is provided with a non-removable seal.

By providing a non-removable seal, it is possible to prevent the seal from loosening or shifting during the mounting of the lid on the pot. This provides extra security against poor sealing.

The invention also has a method for mounting a filter device for the separation of impurities from a gas as subject, whereby the filter device includes a filter housing consisting of a lid and a pot, whereby a filter element is installed in the pot, which filter element consists of a top cap and a bottom cap with a filter cartridge in between, whereby the lid is provided with an inlet for gas to be purified and an outlet for purified gas, whereby the top cap is provided with an inlet duct that will lead gas to be purified to the filter cartridge, whereby, when the pot is mounted on the lid, the entrance of the inlet duct connects to the inlet of the lid and between the lid and the top cap there is a space which is connected to the outlet of the lid, with the characteristic that the filter device on the one hand is provided with positioning means which will position the top cap in relation to the lid during the mounting of the pot on the lid, and on the other hand with pressure means which will press the entrance of the inlet duct against the inlet of the lid after the mounting of the pot on the lid, whereby during the mounting of the pot on the lid the positioning means take effect earlier than the pressure means.

BRIEF DESCRIPTION OF THE DRAWINGS

With the insight to better demonstrate the characteristics of the invention, the following describes, as an example without any restrictive character, some preferred embodiments of a filter device according to the invention, with reference to the accompanying drawings, in which.

DETAILED DESCRIPTION OF THE INVENTION

Figure 1:
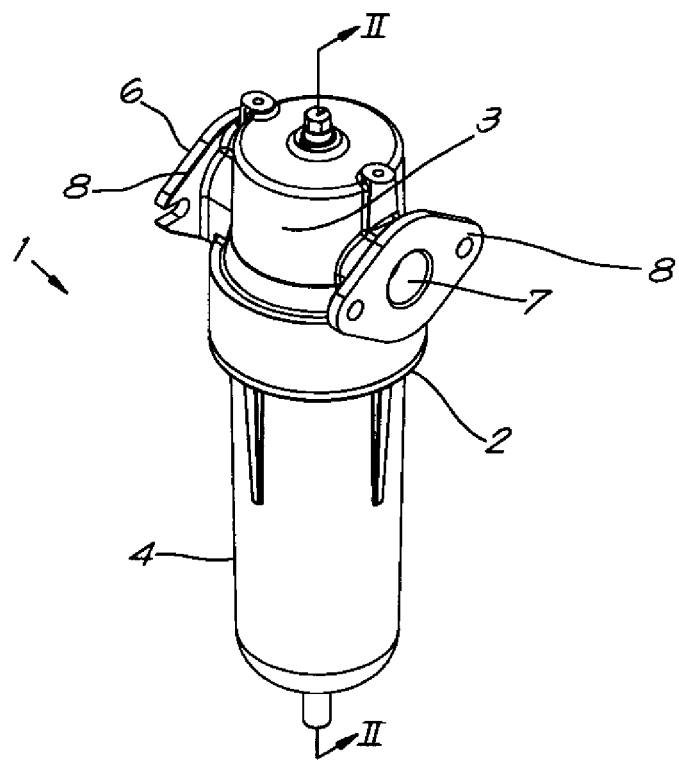
FIG. 1 schematically and in perspective shows a filter device according to the invention.

FIG. 1 shows a filter device 1 according to the invention to separate impurities from a gas.

This gas may be compressed air, but the invention is not limited thereto.

The aforementioned impurities can be oil, water and/or dust.

The filter device 1 contains a filter housing 2, which consists of a lid 3 and a pot 4, which can be mounted on top of each other to form the filter housing 2.

In the example shown, the lid 3 is screwed onto the pot 4, whereby both the lid 3 and the pot 4 are provided with a cooperating screw thread 5.

It is not excluded that the lid 3 is fixed to the pot 4 by means of a bayonet fitting or some other way.

The lid 3 is provided with an inlet 6 for gas to be purified and an outlet 7 for purified gas. Typically, the filter device 1 with its lid 3 is mounted in a pipe of a machine, such as a compressor installation. For this purpose, the lid 3 at the inlet 6 and the outlet 7 are provided with flanges 8 suitable thereto.

Figure 2:
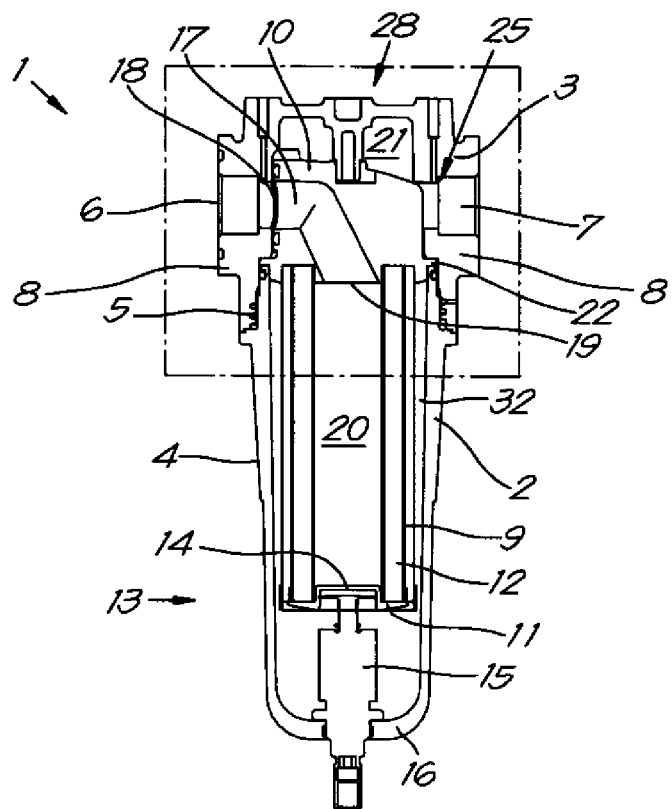
FIG. 2 shows a cross-section according to line II-II in FIG. 1.

In the filter housing 2, more specifically in the pot 4, a filter element 9 is installed. This is shown in FIG. 2, which shows a cross-section.

The filter element 9 consists of a top cap 10 and a bottom cap 11 with a filter cartridge 12 between them, which is made of filter material.

The bottom cap 11 is optionally provided with means 13 to translationally position and/or fix the filter element 9 in the pot 4 in each direction after mounting of the pot 4 in the lid 3. This means that the means 13 limit or forbid a translational shift of the filter element 9 compared to the pot 4 in any direction, but allow an unlimited rotational movement of the filter element 9 relative to the pot 4.

These means 13 are implemented as a cavity 14 or recess that can work together with a thereto provided rod 15 in the bottom 16 of the pot 4.

In addition, these means 13 are designed in such a way that the filter element 9 can be rotated in the pot 4. This means that it is possible that the filter element 9 rotates around its axis in the pot 4.

Figure 3:
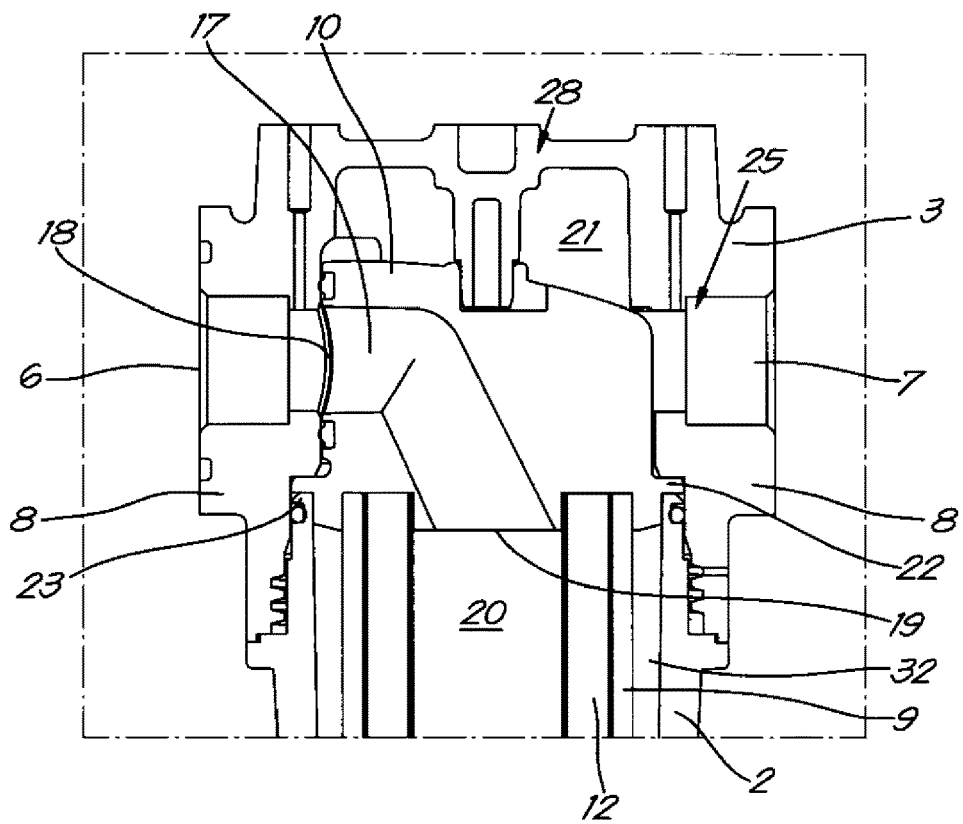
FIG. 3 shows in more detail the part indicated by F3 in FIG. 2.

The detailed FIG. 3 clearly shows how the top cap 10 is made.

The top cap 10 is provided with an inlet duct 17 that will lead gas to be purified to the filter cartridge 12.

The inlet duct 17 has an entrance 18 which, when the pot 4 is mounted on the lid 3, connects to the aforementioned inlet 6 of the lid 3. The inlet duct 17 also has an outlet 19 that connects to the interior 20 of the filter cartridge 12.

As one can clearly see in FIG. 3, there is a space 21 between the lid 3 and the top cap 10 that is connected to the outlet 7 of the lid 3.

In this case, but not necessary for the invention, the top cap 10 has an extending collar 22 or flange which can rest on the upper edge 23 of the pot 4. This will help to position the filter element 9 in the pot 4.

This collar 22 or flange extends over the entire circumference of the upper edge 23 and is provided with at least one passage 24 through the collar. It is also possible that the collar 22 extends only over a part of the circumference of the upper edge 23 or that there are interruptions in the collar 22.

According to the invention, the filter device 1 is provided with positioning means 25 that will position the top cap 10 relative to the lid 3 when mounting the pot 4 on the lid 3.

Figure 4:
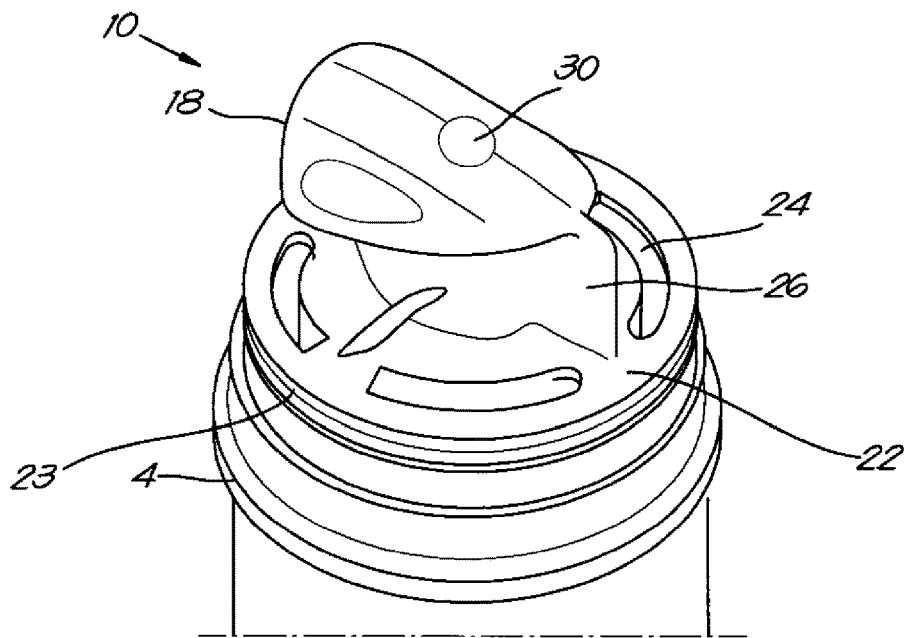
FIG. 4 schematically and in perspective represents the top cap of FIGS. 2 and 3.
Figure 5:
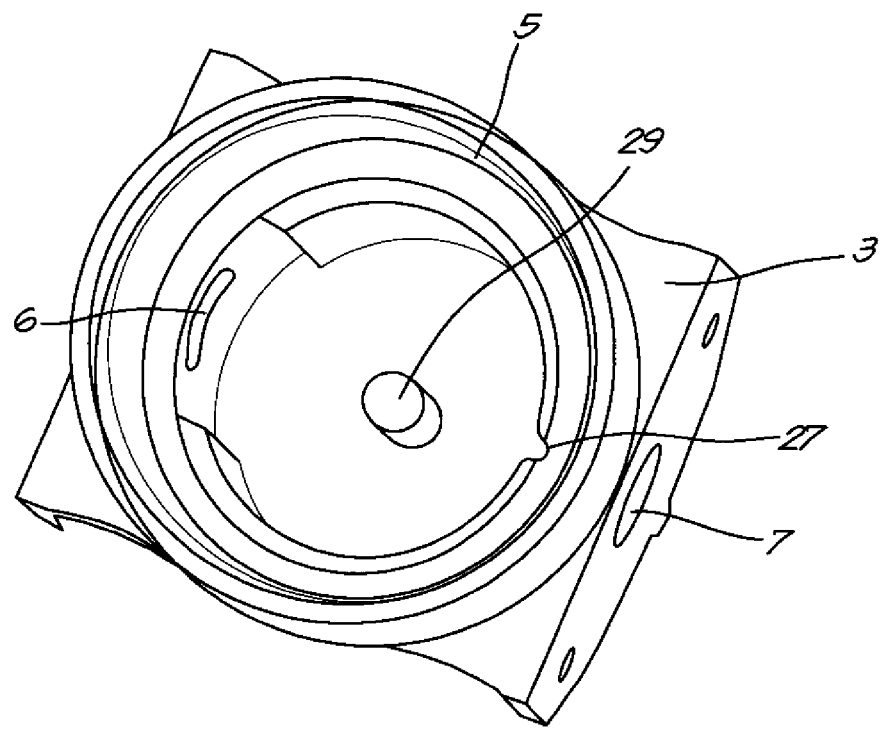
FIG. 5 shows the bottom of the lid in more detail.
Figure 6:
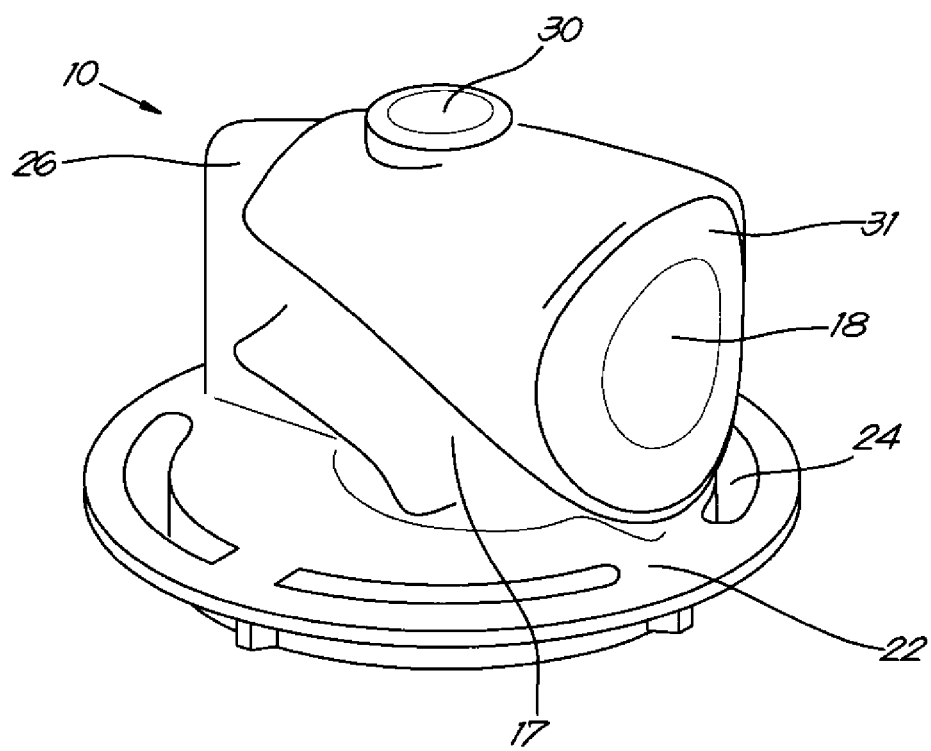
FIG. 6 shows a different view of the top cap in FIG. 4.

In the example shown in FIGS. 4 and 5, these positioning means 25 are executed in the form of, on the one hand, a positioning fin 26 on the top cap 10 and, on the other hand, a positioning recess 27 in the lid 3, whereby the positioning fin 26 of the top cap 10 fits in the positioning recess 27 of the lid 3.

It is clear that it is also possible that the top cap 10 is provided with the positioning recess 27 and the lid 3 of the positioning fin 26 that fits in the positioning recess 27.

Only when the positioning fin 26 is inserted or pushed into the positioning recess 27 in the lid 3, the top cap 10 in the lid 3 will fit.

According to the invention, the filter device 1 is further provided with pressure means 28 which will press the entrance 18 of the inlet duct 17 against the inlet 6 of the lid 3 after mounting the pot 4 on the lid 3.

In the example shown in FIGS. 4 and 5, these pressure means 28 are made in the form of a pin 29 in the lid 3 and a corresponding cavity 30 in the top cap 10.

It is clear that it is also possible that the lid 3 is provided with a cavity 30 and the top cap 10 is provided with a pin 29.

As a result, the distance between the cavity 30 and the inlet 6 of the lid 3 is determined by the distance from the pin 29 to the inlet 6.

By correctly selecting the distance between the pin 29 and the inlet 6, it will be possible to ensure that the entrance 18 of inlet duct 17 is pressed against inlet 6.

As can be seen on FIGS. 3 to 5, the positioning means 25 will take effect earlier than the pressure means 28. Indeed, when inserting the top cap 10 into the lid 3, the positioning fin 26 must be pushed first into the positioning recess 27, before the top cap 10 can be inserted further into the lid 3.

Only when the top cap 10 has been inserted further into the lid 3, the pin 29 will enter the cavity 30 and exert pressure.

Finally, a non-removable seal 31 is provided between the inlet 6 of the lid 3 and the entrance 18 of the inlet duct 17 of the top cap 10.

In a practical version of the invention, the non-removable seal is provided at the entrance 18 of the inlet duct 17.

Preferably, this is poured on the entrance 18, so that it is part of the top cap 10. The seal 31 is preferably made of a thermoplastic elastomer.

It cannot be excluded, however, that the non-removable seal 31 is provided on the inlet 6 of the lid 3 on a side of the lid 3 which is closest to the entrance 18 of the inlet duct 17 of the top cap 10.

However, since the filter element 9 will be replaced from time to time, it is preferable to provide the seal 31 on the top cap 10, so that it can be replaced as well. In this case, the material of the seal 31 must be selected in such a way that the seal 31 can be used continuously for a period of time at least equal to the period between two replacements of the filter element 9, as it is not desirable that the seal 31 should be replaced between two replacements of the filter element 9.

To protect the seal 31 from damage, the inlet 6 of the lid 3 on a side closest to the inlet duct 17 of the top cap 10 when the pot is mounted on the lid, may be rounded or chamfered. This chamfer may, for example, be a straight chamfer of the edge between the inlet 6 and a side of the lid 3 which, when mounted, is closest to the inlet duct 17 of the top cap 10, the straight chamfer being at an angle between 5° and 45° with the side of the lid 3 which is closest to the inlet duct 17 of the top cap 10.

The operation of the filter device 1 is very simple and as follows.

Gas to be purified enters the filter device 1 through the inlet 6 in the lid 3 and then goes through the entrance 18 and the inlet duct 17 of the top cap 10 to the filter cartridge 12.

The outlet 19 of the inlet duct 17 connects to the interior 20 of the filter cartridge 12, so that the gas to be purified will flow through the filter cartridge 12 from the inside to the outside, whereby impurities are removed from the gas when passing through.

The purified gas then enters the zone 32 between the filter cartridge 12 and the pot 4, from where it enters the space 21 between the top cap 10 and the lid 3 via the passages 24 in the collar 22 of the top cap 10.

The purified gas can then leave the filter device 1 via the outlet 7 in the lid 3.

When the filter cartridge 12 is saturated with impurities, it must be replaced.

For this purpose, the pot 4 is unscrewed from the lid 3, as the latter is often fixed in a machine or the like.

It should be noted that the filter element 9 will not move rotationally in relation to the lid 3 but in relation to the pot 4.

When the pot 4 is removed, the filter element 9 can be removed.

A new filter element 9 can then be installed. This new filter element 9 is installed in the pot 4, whereby it is optionally ensured that the rod 15 ends up in the cavity 14 of the bottom cap 11.

Next, the pot 4 is placed under and against the lid 3 and the pot 4 is turned until the positioning fin 26 of the top cap 10 ends up in the positioning recess 27 of the lid 3.

At that moment the top cap 10 will be correctly positioned in relation to the lid 3, so that after screwing on the pot 4 the entrance 18 corresponds to the inlet 6.

In addition, at the same time the top cap 10 can be pushed further into the lid 3 and at the same time the pot 4 can be screwed further into the lid 3. This means that only when the top cap 10 is correctly positioned in relation to the lid 3, the pot 4 can be screwed on.

During screwing the filter element 9 will not rotate with the pot 4.

At a certain moment, when the pot 4 is screwed on far enough, pin 29 will also fit in the cavity 30 and thus push the entrance 18 against the inlet 6.

This ensures a good seal between the entrance 18 and the inlet 6 and no leakage flow can occur.

Despite the fact that in the examples described above, a gas flow from the inlet 6 to the inlet duct 17 and the interior 20 of the filter cartridge 12 runs through the filter cartridge 12 and through the passages 24 in the collar 22 to the space 21 and outlet 7 in the lid 3, it cannot be ruled out that the gas flow may flow in the other direction. That is to say, the gas enters through the outlet 7 in the lid 3, goes through the space 21 through the passages 24 in the collar 22 and then through the filter cartridge 12 and then through the inlet duct 17 to the inlet 6 in the lid 3 to leave the filter device 1.

This invention is by no means limited to the embodiments described as examples and shown in the figures, but a filter device according to the invention can be realised in all shapes and sizes without going beyond the scope of the invention.

The invention claimed is:

1. A filter device for the separation of impurities from a gas,
    whereby the filter device includes a filter housing including a lid and a pot, the pot having a longitudinal axis extending longitudinally with respect thereto, the filter device further including fixing means for fixing the lid to the pot,
    whereby a filter element is installed in the pot, which filter element includes a top cap and a bottom cap with a filter cartridge in between,
    whereby the lid is provided with an inlet for gas to be purified and an outlet for purified gas,
    whereby the top cap is provided with an inlet duct that will lead gas to be purified to the filter cartridge, whereby, when the pot is mounted on the lid, an entrance of the inlet duct connects to the inlet of the lid and between the lid and the top cap is a space that is connected to the outlet of the lid,
    wherein the filter device is provided with positioning means configured to rotatably position the top cap in relation to the lid when mounting the pot on the lid, and with pressure means configured to press the entrance of the inlet duct against the inlet of the lid after mounting the pot on the lid,
    whereby the positioning means and the pressure means are configured such that the positioning means come into action earlier than the pressure means during the rotatable mounting of the pot on the lid about said longitudinal axis, and
    whereby the filter pot is configured such that initially the pot is capable of being rotated about said longitudinal axis with respect to the lid until the top cap is rotatably positionally fixed with respect to the lid by the positioning means and thereafter the pot is capable of being further rotated about said longitudinal axis with respect to the lid so that the top cap is urged further into the lid until the pressure means presses the entrance of the inlet duct against the inlet of the lid to create a seal therebetween.

2. The filter device according to claim 1, wherein the positioning means include a positioning fin on the top cap or in the lid and a positioning recess in the lid or the top cap respectively, whereby the positioning fin of the top cap or the lid respectively fits into the positioning recess of the lid or the top cap respectively.

3. The filter device according to claim 1, wherein the pressure means include a pin in the lid or on the top cap and a cavity corresponding to the pin in the top cap or the lid respectively, in such a way that a distance from the cavity to the inlet of the lid is determined by a distance from the pin to the inlet.

4. The filter device according to claim 1, further comprising a non-removable seal on one of the inlet of the lid and the entrance of the inlet duct.

5. The filter device according to claim 4, wherein the seal has been poured on one of the inlet and the entrance.

6. The filter device according to claim 4, wherein the seal is made out of a thermoplastic elastomer.

7. The filter device according to claim 1, wherein the top cap is provided with an extending collar which rests upon an upper edge of the pot.

8. The filter device according to claim 7, wherein the collar extends over an entire circumference of the upper edge and at least one passage is provided through the collar in such a way that a connection is made between the space and a zone between the filter cartridge and the pot.

9. The filter device according to claim 1, wherein the inlet of the lid on a side which, when the pot is mounted on the lid, is closest to the entrance of the inlet duct, is provided with a rounding or a chamfer.

10. The filter device according to claim 1, wherein the entrance of the inlet duct faces radially outward and the pressure means radially urges the entrance of the inlet duct against the inlet of the lid to create the seal.

11. The filter device according to claim 10, wherein the inlet duct is curved approximately 90 degrees.

12. The filter device according to claim 1, wherein the top cap is not directly fixedly secured to the pot.

13. A filter device for the separation of impurities from a gas,
    whereby the filter device includes a filter housing including a lid and a pot,
    whereby a filter element is installed in the pot, which filter element includes a top cap and a bottom cap with a filter cartridge in between,
    whereby the lid is provided with an inlet for gas to be purified and an outlet for purified gas,
    whereby the top cap is provided with an inlet duct that will lead gas to be purified to the filter cartridge, whereby, when the pot is mounted on the lid, an entrance of the inlet duct connects to the inlet of the lid and between the lid and the top cap is a space that is connected to the outlet of the lid,
    wherein the filter device is provided with positioning means configured to rotatably position the top cap in relation to the lid when mounting the pot on the lid, and with pressure means configured to press the entrance of the inlet duct against the inlet of the lid after mounting the pot on the lid,
    whereby the positioning means and the pressure means are configured such that the positioning means come into action earlier than the pressure means during the mounting of the pot on the lid,
    wherein the top cap is provided with an extending collar which rests upon an upper edge of the pot, and
    wherein the collar extends over an entire circumference of the upper edge and at least one passage is provided through the collar in such a way that a connection is made between the space and a zone between the filter cartridge and the pot.

14. The filter device according to claim 13, wherein the top cap is removable from the pot and freely rotatable with respect to the pot, the top cap being held in place between the lid and the pot when the lid is fixed to the pot by the fixing means.

* * * * *